2,346,521

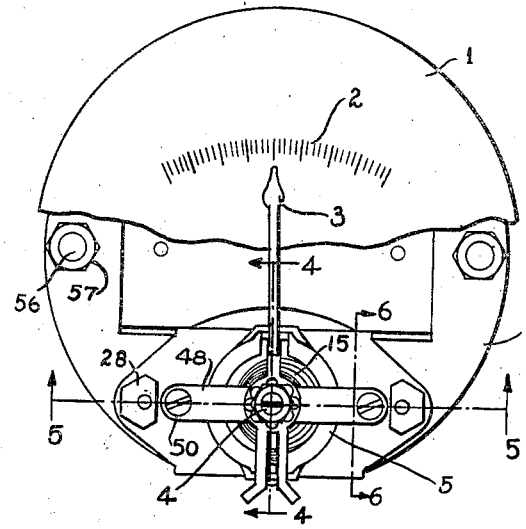
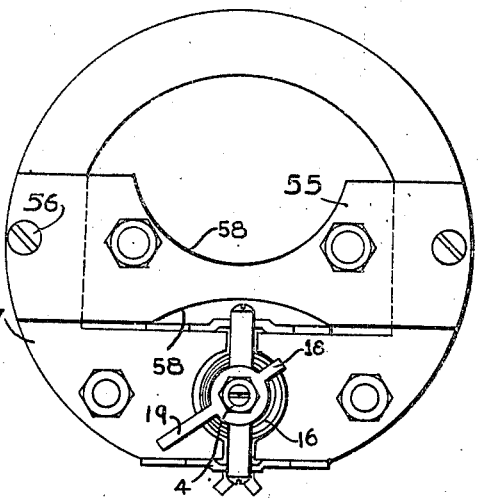
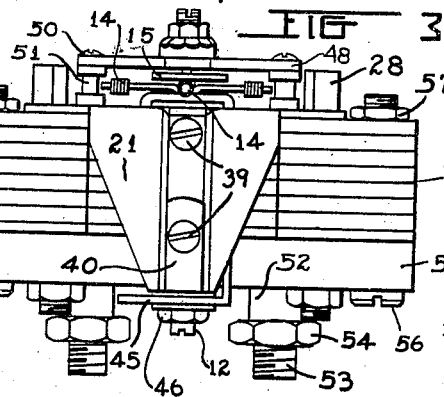
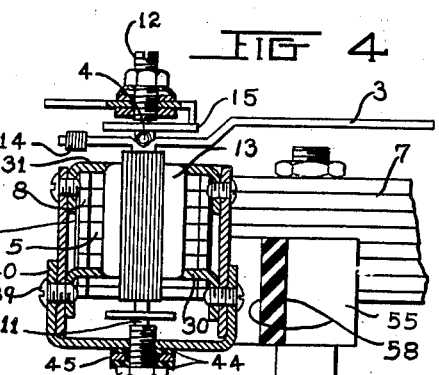
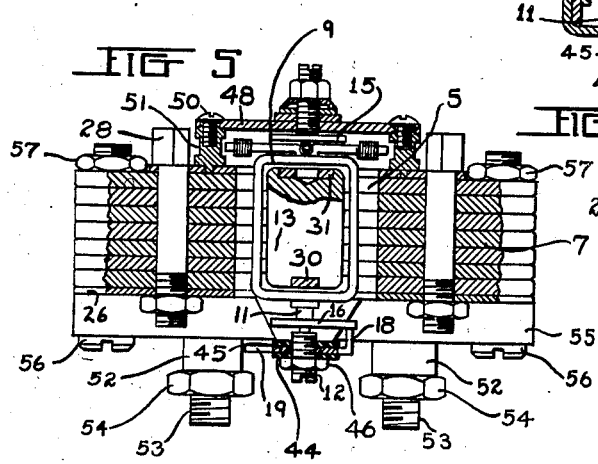
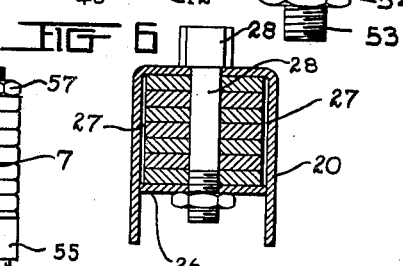
INVENTOR
RAY L. TRIPLETT
BY
Toulmin & Toulmin
ATTORNEYS April 11, 1944. R. L. TRIPLETT 2,346,521
ELECTRICAL MEASURING INSTRUMENT
Filed May 11, 1942 2 Sheets-Sheet 2
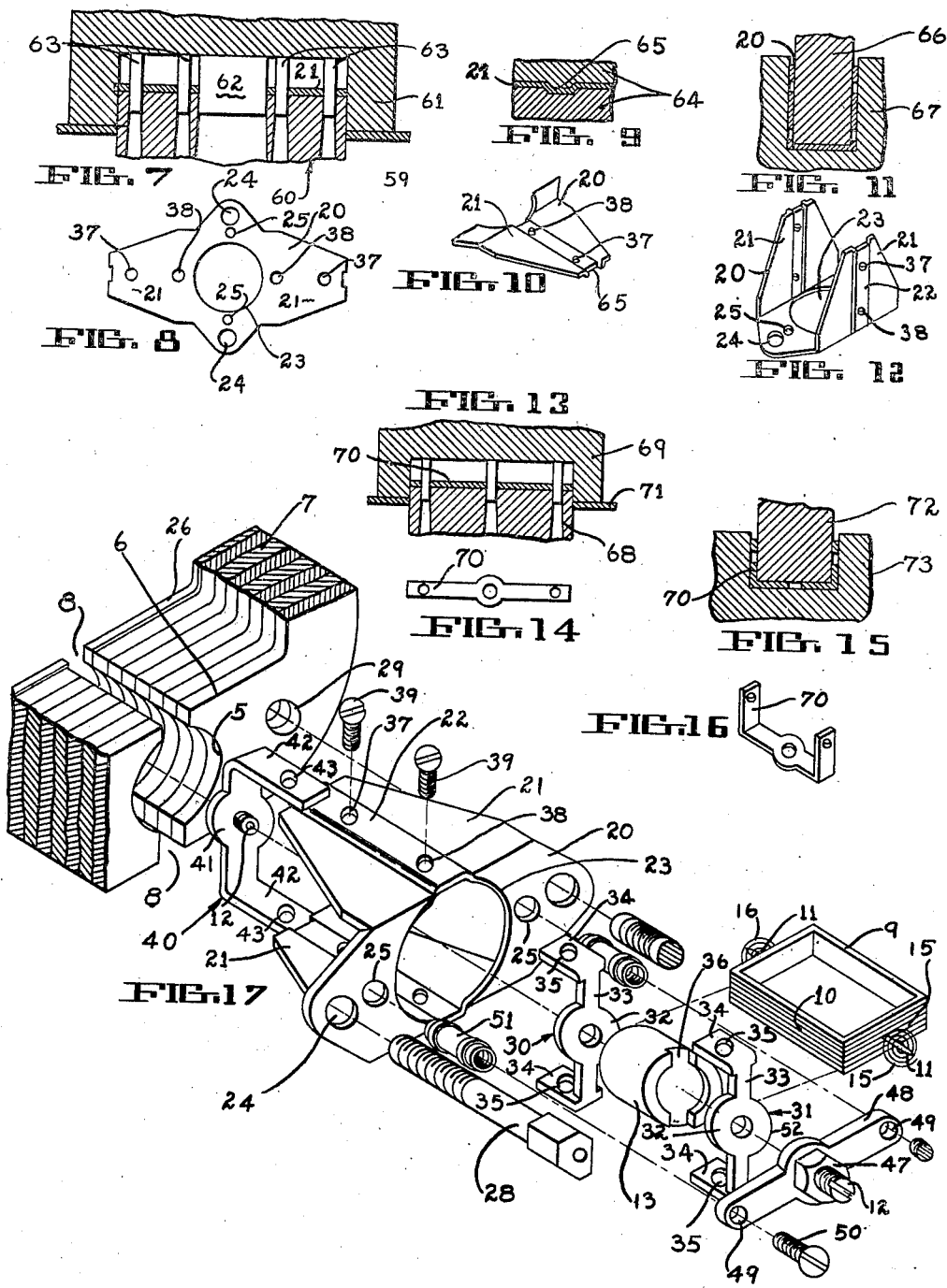
INVENTOR
RAY L. TRIPLETT
Toulmin + Toulmin
ATTORNEYS Patented Apr. 11, 1944

UNITED STATES PATENT OFFICE 2,346,521

ELECTRICAL MEASURING INSTRUMENT

Ray L. Triplett, Bluffton, Ohio

Application May 11, 1942, Serial No. 442,443

7 Claims. (Cl. 171—95)

The present invention relates to electrical apparatus, and more particularly to instruments for measuring currents and voltages.

This invention relates to electrical measuring instruments of the D'Arsonval moving coil type. Particular consideration is given to the formed metal parts, so arranged as to give greater accuracy in the forming operation, at the same time reducing these operations to a minimum. Thus, accuracy in fitting the parts in the assembled movement is in a large part limited to the accuracy of the forming dies over which the metal parts are processed. Once these are standardized the parts can be uniformly produced, irrespective of slight variations in the thickness and temper of the metal used. In order to accomplish this the parts are bent into a U-shape with a balance of material on either side of the U, thus forming each side of the same size, shape and configuration. Accordingly, there will be equal pressure distribution in the forming operation, and metals which may vary slightly in thickness and temper will be formed alike with uniform elongation and dimensions. Production and assembly of such parts simplify construction and results in better accuracy of alignment with the other parts to which they are fitted.

Instruments which employ parts of complicated and irregular shape, without regard to the amount of material carried by the formed part in each direction, thereby unbalancing the forming operation, must ordinarily be made by hand in order to assure proper alignment between the parts. Such instruments are therefore not commercially practicable on account of the low spread between the selling and manufacturing costs, which requires that every element of the instrument must be made by an automatic machine and that as many parts as possible, with the exception of the screws, must be made by a punching or stamping operation.

The primary object of the present invention is to reduce the present manufacturing costs of electrical measuring instruments.

Another object is to provide an instrument in which the mountings and fittings are of simple design, which lend their fabrication to punch and screw machine manufacture, thus eliminating hand labor.

Still another object is to provide an instrument in which the metal of each frame element is distributed evenly on both sides of the central axis of the element in order to facilitate manufacture and to eliminate the necessity for close tolerances of dimensions and of heat treatments, etc.

Another object is to provide an electrical measuring instrument in which the alignment between the movable and stationary parts is obtained in a simple but highly effective manner.

The invention will be better understood when the following specification is read in connection with the accompanying drawings.

In the drawings:

Figure 1 is a plan view of the improved instrument with a portion of the dial removed to expose the interior parts.

Figure 2 is a view looking toward the rear of the instrument.

Figure 3 is an elevational view looking toward the lower edge of the instrument shown in Figure 1.

Figure 4 is a sectional view taken along the line 4—4 in Figure 1.

Figure 5 is a sectional view taken along the line 5—5 in Figure 1.

Figure 6 is a view taken along the line 6—6 in Figure 1, looking in the direction of the arrows.

Figure 7 illustrates the blanking-out process for the U-shaped frame or movement plate which carries the movable elements.

Figure 8 shows the metal blank after the forming operation of Figure 7.

Figure 9 illustrates the grooving or upsetting operation performed on portions of the blank shown in Figure 8.

Figure 10 illustrates the blank after the grooving operation.

Figure 11 shows still another operation on the frame member, that of bending the sides to a U-shape.

Figure 12 illustrates the finished member.

Figure 13 shows the blanking-out process of the bridge which supports one end of the stationary core member, while Figure 14 shows the element as blanked out.

Figure 15 illustrates the bending operation by which the blank shown in Figure 14 is formed to a U-shape.

Figure 16 illustrates the finished element after the blanking and bending operations.

Figure 17 is an exploded view of all of the elements of the instrument and in their relative positions.

Referring more particularly to Figure 1, the numeral 1 designates a white-faced dial having indications 2 marked thereon, over which a pointer 3 moves in response to current or voltage applied to the instrument. The pointer is pivoted at the point 4, which is positioned at the center of a circular opening 5 formed by the legs of pole pieces 6 of a magnet assembly 7. As can be seen in Figures 5 and 17, this assembly is constituted of a number of relatively thin iron stampings which are magnetized so that the pole pieces 6 form north and south poles. These pole pieces are separated by a space indicated at 8 in Figure 17.

The element or movement which rotates in the opening 5, and is therefore subject to the magnetic field, is constituted of a narrow rectangular frame 9 (Figure 17) of insulating material on which is wound a coil 10. The frame 9 is carried at each end on small stub shafts 11, which are journalled at their outer ends in jewels contained within the screw members 12 (Figures 4 and 17). Within the frame 9 there is positioned a metal cylinder 13 which constitutes the core of the magnet assembly, and is fixed in space and secured to the magnet assembly in the manner described hereinafter. The diameter of the core 13 is such as to permit the frame 9 to swing about the same. The pointer 3 constitutes one of four spokes which project radially from the pivot point 4, these spokes being equidistantly spaced and extending horizontally with respect to the instrument. The spokes, other than the pointer, are weighted at their ends, as indicated at 14, these weights serving to balance the pointer as it moves about the pivot.

Voltages are impressed across the coil 10 through a pair of hair springs 15, 16, the connections being preferably made from the center of each spring to each end of the coil. In addition to serving as an electrical connector between the stationary and movable parts of the meter, the springs 15, 16 serve to tension the pointer 3 and to adjust the same to its correct zero position. The inner end of the lower spring 16 (Figure 5) is secured to the shaft 11, and the outer end of the spring is fastened to a finger 18 which projects upwardly from a forked lever 19 pivoted at the lower screw 12. Thus by rotating the forked lever 19 the tension on the spring 16 can be adjusted, which in turn, either increases or decreases the normal torsion applied to the pointer 3, depending on the direction in which the lever is moved. The screw members 12 are held at a fixed distance apart by a rigid frame, to be described presently, and which is so designed that the amount of material to one side of the axis of each element exactly balances the amount of material at the other side of the axis. Thus each element which forms the frame is of a symmetrical character as regards weight, shape, etc.

This frame constitutes essentially a U-shaped element 20 preferably of a non-magnetic metal such as brass (Figure 17). This element is provided with triangularly shaped legs 21 having a ridge or groove 22 formed therein to reenforce the legs, and is provided with a large circular opening 23 positioned in the base portion of the element. This portion is also provided with a pair of apertures 24 positioned near the outer ends of the base portion, and a pair of smaller apertures 25 positioned between each aperture 24 and the central opening 23. This U-shaped element provides the main supporting structure for the movement of the instrument, and in order that it may be properly aligned with respect to the magnet assembly 7 there is provided a brass plate 26 at the bottom of the assembly (Figure 6), this plate extending a short distance beyond each side of the magnet assembly, as is clearly shown in this figure. The width of the plate 26 is such as snugly to fit between the legs 21 of the U-shaped element 20, leaving a space indicated at 27 between the iron portion of the assembly and the legs 21.

The element 20 is secured to the magnet assembly by means of the bolts 28 passing through the openings 24 of the element and through openings 29 in the magnet assembly, these bolts also serving to secure the brass plate 26 to the magnet assembly, as is clearly shown in Figure 6. By providing a snug fit between the plate 26 and the element 20, leaving a space 27 between the element and the sides of the magnet assembly, it is apparent that the width of the magnet assembly, as shown in Figure 6, is not important since the assembly does not contribute to the support or position of the element 20 except through the bolt 28.

The core 13 is maintained in position within the opening 5 of the magnet assembly by means of a pair of U-shaped straps or bar bridges generally designated 30, 31 having circular portions 32 at the center which extend into diametrically positioned rectangular portions 33, the latter terminating in bent strap portions 34. These strap portions are provided with threaded apertures 35 for securing the core to the U-shaped element 20, as will be explained presently. The core 13 is countersunk at each end to provide depressions, indicated at 36, of a shape to receive the circular and rectangular portions 32, 33 of the straps 30, 31. The depth of each depression is such that the straps lie flush with the ends of the core.

There is a pair of openings 37, 38 provided in each ridge 22 of the element 20, the screws 39 being adapted to pass through these openings and to be threaded into the apertures 35 of the strap members 30, 31. The outer strap portions 34 of the elements 30, 31 are spaced a distance apart such as to cause a snug fit between the outer surfaces of these portions within the depressions formed by the ridges 22. The width of the portions 34 is also such as to cause a snug fit along these widths within the ridges 22. Thus the straps or bar bridges 30, 31 can be readily aligned by the grooves extending along the legs 21, and can be securely held in position by the screws 39 cooperating with these grooves. It will be noted that the strap member 30 extends in the same general direction as the strap member 31, so that when these strap members and the core are assembled within the element 20 the core is positioned nearer the front face of the element 20 than at the far ends of the legs 21.

The left-hand screw member 12, which contains a jewel bearing and as seen in Figure 17 is supported from a U-shaped strap member or bar bridge 40, has a circular portion 41 terminating in bent rectangular portions 42 similar to the bar bridges 30, 31. The bent portions 42 are provided with apertures 43 and are spaced apart a distance snugly to fit the outer surfaces of the ridges 22. The strap member or bar bridge 40 is held in position by the same screws 39 which secure the bar bridge 30 in position. The screw member 12 contained in the strap member 40 is held in position by means of a pair of spaced washers 44 with an intervening metal washer 45, these washers being clamped against the bar bridge by a nut 46 (Figure 4). The jewel bearing in this screw member 12 receives the left-hand stub shaft 11 (Figure 17) which carries the rotating frame 9. The opposite stub shaft 11 of the frame 9 is received in a jewel bearing contained within the right-hand screw member 12 secured by the nut 47 to a bar bridge 48, these members being provided with openings 49 at the ends to receive the screws 50. The latter, passing through the openings 49, are threaded into the nearer ends of the small hollow rods 51. The opposite ends of these rods fit into the openings 25 of the element 20, to which they are riveted.

When all of the bars shown in Figure 17 have been properly assembled, it will be found that the core 13 is fixedly positioned within the opening 5 of the magnet assembly and that the frame 9, which carries the coil 10, will be adapted to rotate about the core 13 against the torsional effects exerted by the springs 15, 16. These effects can be changed by rotating the forked lever 19 slightly to increase the tension on one of the springs, thus serving to control the mechanical damping of the pointer 3, as well as its initial position.

As stated hereinbefore, a voltage is applied to the coil 10 through the springs 15, 16 to which the ends of the coil are connected, and wires are taken from the outer ends of the springs 15, 16 in any suitable and well known manner to a pair of terminal posts 52. These posts may comprise rods 53 which carry the nuts 54 for making connection to external circuits, the rods 53 being riveted or otherwise secured to a plate 55 of insulating material which extends diametrically across the magnet assembly. This plate is secured to the assembly by means of the bolts 56 and the nuts 57. The same bolts 56 may also be employed, if desired, for holding the dial 1 in position. The plate 55 may be provided with circular notches or cutaway portions 58 to reduce the weight of the instrument as much as possible, and also to facilitate assembly.

A study of Figure 17 will show that the element 20, also the bar bridges 30, 31, 40, 48 are of a symmetrical configuration, i. e. there is the same amount of metal on each side of an imaginary axis as there is on the other side of the axis, and further that this metal is equally disposed on each side of the axis. There are no portions of these bar bridges which are twisted into peculiar shapes which destroy the symmetry of design, and the only change from a perfectly flat shape is that of forming the various supporting elements into a U-shape by a symmetrically positioned bend. It is apparent that by giving these supporting elements a simple, symmetrical configuration their manufacture is facilitated and any undue elongation or shortening of one of the bent portions, due perhaps to improper heat treatment, is offset by a similar elongation or shortening of the other bent portion. It will be understood that the distances between the parts and between their respective openings, along the direction of the main axis of the instrument, cause little or no difficulty in the alignment or adjustment of the parts because the overall change can be readily accommodated at the screws 12. On the other hand, if one-half of one of the bar bridges has a different shape or cross section than the other half of the bar bridge, so that the element as a whole is not of symmetrical shape, the assembly of the parts would be rendered difficult and proper alignment would be almost impossible.

In Figures 7 to 16 there are shown typical methods of fabricating the various supporting elements, including the bar bridges. The U-shaped element 20 is preferably stamped out of flat sheet-metal, as indicated in Figure 8, by means of the press punch shown in Figure 7. The metal sheet is indicated at 59, the male and female dies being designated 60 and 61 respectively. Suitable punches 62, 63 are secured to the die member 61 for punching out the openings 23, 24, 25, 37 and 38. The ridges 22 are then formed in the triangularly shaped legs 21 by means of a pair of pressing dies 64 (Figure 9), provided with a projection 65 of proper shape. The next step is to form the flat member into a U-shape, and this may be done between the male and female die members 66, 67 respectively (Figure 11), which produces the finished article shown in Figure 12. A typical bar bridge support may be formed in the press shown in Figure 13, the dies being designated 68, 69. The element 70 (Figure 14) is punched out of sheet stock 71 and provided with the necessary openings, as well as the circular portion at the middle. The element may then be bent to a U-shape by the die members 72, 73 (Figure 15) to form the U-shaped member shown in Figure 16.

Thus all of the parts of the improved instrument can be inexpensively made either by a stamping operation, as exemplified in Figures 7 to 16, or on a screw machine for the various screws. The core member 13 is the only other element, apart from the magnet assembly 7, which requires special tools in milling the countersunk portions at each end. The magnet assembly requires little or no machine work except for the drilling of the openings 29 and the openings to receive the bolts 56. Even the size of the magnet assembly is of little importance because the pole piece surfaces of the assembly are not depended upon to align or position the U-shaped element 20, but instead this alignment is obtained solely by the use of the brass plate 26 which fits snugly between the legs of the U-shaped element. It is therefore evident that the instrument as a whole can be quite inexpensively made, not only by simple mechanical tools, for example, ordinary pressing and stamping dies, but also in not requiring close tolerances of temper, and other heat treatments.

The metal of the parts of the movement assembly positioned above the horizontal axis of the instrument, as seen in Figure 17, is practically equal to the metal of those parts below the axis. Similarly the metal of the parts of the movement assembly to the right of the vertical axis of the instrument is substantially equal to the metal of those parts to the left of that axis, as seen in Figure 17. All of the parts, particularly those of the movement assembly, are therefore symmetrical about the horizontal and vertical axes of the instrument. This symmetry of design provides a balance of material for the various forming and fabricating operations, and in addition permits the instrument, when subjected to elevated temperatures, to operate with considerably more accuracy than the instruments heretofore employed, because any change in temperature will affect the parts at one side of the instrument to the same extent as the parts at the opposite side of the instrument.

The fact that the bent portions 34 of the bar bridges 30, 31 are rigidly held within the grooves of the U-shaped element 20 and additionally by the screws 39, causes the core 13 to be maintained rigidly in position and in line with the jewel bearings. Consequently, the frame 9 need have interior dimensions which only just clear the core 13, without any danger of obstruction to rotational movement, so that the magnetic reaction between the coil 10 and the core 13 is of the greatest effectiveness. It will be understood that the entire assembly is contained in a casing preferably of a phenolic condensation product, provided with a glass upper surface through which the movement of the pointer 3 can be observed. The casing is also provided with a bottom plate, to which the instrument may be secured by the threaded rods 53.

It will be understood that I desire to comprehend within this invention such modifications as come within the scope of the claims and the invention.

Having thus fully described my invention, what I claim as new and desire to secure by Letters Patent, is:

1. An electrical measuring instrument comprising a magnet assembly terminating in opposed pole pieces, a metal plate of substantially the same shape as the magnet assembly but having greater width than the assembly in the region of the pole pieces, and a stationary U-shaped frame member extending over the pole pieces and carrying the movable element of the instrument, the legs of said frame member being spaced apart a distance greater than the width of the magnet assembly at the pole pieces but equal to the width of the metal plate in the region of the pole pieces, whereby the frame member fits snugly about the metal plate and means for attaching said plate rigidly to said magnet assembly whereby the U-shaped frame is held in alignment with the magnet assembly by said metal plate.

2. An electrical measuring instrument comprising a magnet assembly terminating in opposed pole pieces, a stationary U-shaped frame member secured to the pole pieces and carrying the movable unit of the instrument including a movable coil, a stationary core contained within said coil and about which the coil is adapted to rotate, and bar bridges spanning the ends of the legs of the U-shaped frame member for holding each end of the core in position, each of said bar bridges having a uniform cross sectional area and a symmetrical shape on each side of the coil axis the legs of said U-shaped frame serving to position near the end thereof, one of said bar bridges.

3. An electrical measuring instrument comprising a magnet assembly terminating in opposed pole pieces, a stationary U-shaped frame member secured to the pole pieces and carrying the movable unit of the instrument including a movable coil, a stationary core contained within said coil and about which the coil is adapted to rotate, and metal strips spanning the ends of the legs of the U-shaped frame member and secured to the ends of the core, said frame member being provided with grooves which extend along each leg, and said strips being provided with bent portions which fit snugly within the grooves of the U-shaped frame member whereby the core is held rigidly in position within the frame member.

4. An electrical measuring instrument comprising a magnet assembly terminating in opposed pole pieces, a stationary U-shaped frame member secured to the pole pieces and carrying the movable unit of the instrument including a movable coil, a stationary core contained within said coil and about which the coil is adapted to rotate, and metal strips spanning the ends of the legs of the U-shaped frame member and secured to the ends of the core, said frame member being provided with grooves which extend along each leg, and said strips being provided with bent portions which fit snugly within the grooves of the U-shaped frame member whereby the core is held rigidly in position within the frame member, said strips having a uniform cross sectional area and a symmetrical shape on each side of the coil axis.

5. An electrical measuring instrument comprising a magnet asesmbly terminating in opposed pole pieces which extend inwardly toward one another, a coil element adapted to rotate between said pole pieces, a stationary U-shaped frame member carrying said coil element, said member having legs of symmetrical shape and size which extend and contact with opposite sides of the inwardly projecting portions of said pole pieces, the said legs each having an equal weight of material on opposite sides of the longitudinal axis of said coil element.

6. An electrical measuring instrument comprising a magnet assembly terminating in opposed pole pieces, a coil element adapted to rotate about a cylindrical core which is positioned between said pole pieces, and a stationary frame member for rigidly mounting the cylindrical core with respect to the pole pieces, each end of the coil element being supported by a bar secured to the frame member, said frame member also comprising a pair of U-shaped bar supports which are received within countersunk openings at each end of the cylindrical core and are secured to the magnet assembly.

7. An electrical measuring instrument comprising a magnet assembly terminating in opposed pole pieces, a stationary U-shaped frame member secured to the pole pieces and carrying the movable unit of the instrument including a movable coil, a stationary core contained within said coil and about which the coil is adapted to rotate, means including a pair of bar bridges secured at their ends to said U-shaped frame member and carrying the cylinder between them, and a pair of bar bridges secured to the frame member for providing jewel bearings between which the coil element rotates, all of said bar bridges and said U-shaped frame member having symmetrical shapes considered from the longitudinal axis which extends transversely through said cylinder and also symmetrical shapes as considered from the vertical axis extending through said cylinder.

RAY L. TRIPLETT.